United States Patent [19]
Lee

[11] Patent Number: 5,145,707
[45] Date of Patent: Sep. 8, 1992

[54] SALT ENHANCER

[75] Inventor: Thomas D. Lee, Scarsdale, N.Y.

[73] Assignee: Kraft General Foods, Inc., Northfield, Ill.

[21] Appl. No.: 807,038

[22] Filed: Dec. 12, 1991

[51] Int. Cl.[5] ............................................. A23L 1/237
[52] U.S. Cl. .................................................. 426/649
[58] Field of Search ........................................ 426/649

[56] References Cited

U.S. PATENT DOCUMENTS

| | | | |
|---|---|---|---|
| 4,243,691 | 1/1981 | Mohlenkamp et al. | 426/649 |
| 4,915,962 | 4/1990 | Howard | 426/649 X |
| 4,997,672 | 3/1991 | DeSimone et al. | 426/649 |
| 5,000,977 | 3/1991 | Marggrader et al. | 426/649 |

*Primary Examiner*—Joseph Golin
*Attorney, Agent, or Firm*—Linn I. Grim

[57] ABSTRACT

An edible salt enhancing composition is provided which is a combination of L-aspartic acid and L-arginine and sodium chloride.

4 Claims, No Drawings

SALT ENHANCER

BACKGROUND OF THE INVENTION

Essential hypertension is a serious health problem accounting for approximately 90% of the 24 million cases of high blood pressure in the United States (see Marx, J. L., Science 194 821–5, 1976). Excessive salt (NaCl) intake is believed to be an important factor in its development. The average intake of salt by adults in the U.S. is 10–12 g/day, only one third of which comes from the natural foodstuffs making up the diet with the remaining two thirds provided by sodium chloride added by the consumer or by the food manufacturer to improve palatability. Thus, an effective means for reducing sodium intake in the diet while maintaining the overall palatability of foodstuffs would have great value.

Numerous attempts have been made to develop sodium-free salt substitutes based on potassium chloride but without notable success owing to the pronounced bitterness which potassium chloride displays in addition to its salty character. Various stratagems have been used to mask the bitter flavor and provide acceptable palatability. Thus, U.S. Pat. No. 4,243,691 discloses a sodium free salt substitute which comprises a 5'-nucleotide component, an amino acid mixture, a sugar component, potassium phosphate, and potassium chloride. The amino acid mixture, which may include aspartic acid among its components, comprises a substantial fraction (10–40%) of the composition. U.S. Pat. No. 2,829,056 discloses a sodium free dietary seasoning composition based on a mixture of various basic and acidic amino acid salts plus potassium chloride.

U.S. Pat. No. 4,340,614 reveals a stringently sodium-restricted dietetic salt substitute consisting of potassium chloride mixed with the potassium salts of adipic, tartaric, and glutamic acid plus a 5'-nucleotide.

Other attempts to provide sodium-free salt substitutes have relied on the use of mixtures of the salt forms of various amino acids and peptides. The monohydrochloride salts of the basic dipeptides ornithyltaurine and ornithyl-beta-alanine were reported to have a salty taste (see Tada, M. et al., J. Agric. Biol. Chem. 32:992, 1984). French Patent No. 2,547,992 discloses a salty-flavored composition comprising glutamic acid and aspartic acid either in acid form or as non-sodium salts. U.S. Pat. No. 2,500,919 reveals a sodium-free seasoning composition capable of yielding monopotassium glutamate in the presence of water as a meat flavoring agent.

A chloride-free product with a saline taste is revealed in U.S. Pat. No. 1,874,055 comprising the alkali metal salt of formic, acetic or lactic acid with glutamic acid or a protein hydrolysate capable of yielding mixtures of different amino acids. In general, attempts to provide sodium-free or low sodium salt substitutes has met with only partial success because such compositions either have low saltiness value when compared to sodium chloride, have off-flavors associated therewith or otherwise do not provide a seasoning quality equal to that of sodium chloride. Moreover, some salt substitutes that have been proposed are unavailable or are extremely expensive as compared to ordinary table salt as for example, ornithyl-beta-alanine, and ornithyltaurine, and therefore do not represent a practical means for a meaningful reduction of sodium in the diet.

Tamura et al. (see Agric. Biol. Chem., 53(6):1625–33, 1989) have shown that the saltiness of sodium chloride in aqueous solution can be modified by the addition of the hydrochloride salts of certain amino compounds (amino acids and amino acid esters). Both enhancement of salty flavor and diminishment of salty flavor was observed when the amino compound was present at concentrations ranging from 0.0075 to 0.045 molar. In many cases, a sour, bitter, umami, or other undesirable off-flavor was also introduced owing to the high concentration of amino compound tested. The pronounced tendency of acidic amino acids, for example, glutamic acid, to contribute undesirable umami flavor was pointed out. It is known that L-aspartic acid alone in water solutions imparts a sour taste while L-arginine alone imparts a bitter taste.

SUMMARY OF THE INVENTION

It has now been surprisingly discovered that the combination of L-aspartic acid with L-arginine has the ability to enhance the salty flavor of sodium chloride in foods without sour or bitter taste. The degree of enhancement is from about 10 to about 50% in the perceived salty taste of sodium chloride brought about by the combination of L-aspartic and L-arginine at the effective concentration range of the present invention. Thus, edible seasoning compositions comprising L-aspartic acid, L-arginine and sodium chloride are disclosed which may be used to season foods to provide a flavor enhanced food product with about one third less sodium in the most favorable case while maintaining equivalent saltiness. The combination of L-aspartic acid and L-arginine is present in amounts ranging from about 0.8:1 to about 1:1.2 mole ratios of L-aspartic acid to L-arginine, preferably a mole ratio of 1:1. Specifically, L-aspartic acid and L-arginine are found to enhance the saltiness of sodium chloride in products when present at weight ratios of the combination of L-aspartic acid and L-arginine to sodium chloride to be between about 0.5:1 and about 1:1.5, preferably, about 0.8:1 to about 1:1.2, more Preferably about 1:1. Thus, use of L-aspartic acid and L-arginine admixed with sodium chloride according to the invention provides a seasoning composition of exceptional quality virtually indistinguishable from pure sodium chloride in salty character and absence of undesirable off-flavors. A further advantage is conferred by the fact that L-aspartic acid and L-arginine are common food components and may be safely added to foods. Yet another advantage is one of economics in that L-aspartic acid and L-arginine are readily available, low cost amino acids.

PREFERRED EMBODIMENT OF THE INVENTION

Broadly, the weight ratio of the combination of L-aspartic acid and L-arginine to sodium chloride in the seasoning compositions of the present invention should be between about 0.5:1 to about 1:1.5 when such compositions are used to season foods to provide enhanced flavor without the introduction of undesirable off-flavor. Preferably, the weight ratio of the combination of L-aspartic acid and L-arginine to sodium chloride should be in the range between about 0.8:1 and about 1:1.2.

Any source of sodium chloride is suitable for use in the invention. It is important, of course, to use food grade salt, free from harmful or highly flavorful impurities since the intended use is for the seasoning of foods for human and animal consumption.

Likewise, any food grade source of L-aspartic acid or L-arginine is suitable including those derived from animal and vegetable protein hydrolysates. Care should be taken to exclude any by-products from such hydrolysates that could confer off-flavor to the composition. Thus, hydrolysates containing undue amounts of bitter peptides or other highly flavorful impurities are to be avoided. As far as is known, only the L forms of aspartic acid and arginine are effective in the present invention. It is envisioned that racemic mixtures containing both D and L forms of aspartic acid or arginine may be suitably employed but such are not preferred.

Since the compositions of the present invention are intended for use as food seasonings, it is envisioned that such may be used as a salt substitute or mixed with minor amounts of other food ingredients, spices, flavors, excipients, diluents, anti-caking agents and the like.

It is further envisioned that the compositions of the present invention may be used to season a broad range of food products. Thus, the inventive composition may be used in any processed food to enhance ordinary salt (sodium chloride) at from about 90% to about 40% of the level of ordinary salt that would otherwise be used to achieve a comparable level of seasoning. Thus, the compositions may be used to season a broad range of foods such as sauces, soups, breads, cookies, cakes, pies, frozen or refrigerated foods, baked goods, crackers, potato chips, canned vegetables, meats, condiments and the like.

The following examples are further illustrative of the invention:

EXAMPLE 1

The compounds of this invention can be prepared by physically mixing the appropriate amounts of L-aspartic acid, L-arginine and NaCl (salt). Another technique is by dissolving each component in water, mixing the water solutions and removing the water by vacuum to obtain the desired product. These and other mixing techniques can be used to obtain the desired product which is a salt enhancer. To demonstrate the effectiveness of the product of this invention, the following procedures were used. A fish filet was shaken in a bag containing bread crumbs (100 grams) and salt or salt/salt enhancer (the quantities in samples 1–4 are specified below). The coated fish was placed on a flat pan and it was baked at 400° F. for 15 minutes. It was tasted hot.

| Sample # | Salt or Salt/Salt Enhancer | Total Weight | Comment |
|---|---|---|---|
| 1 | NaCl | 4.488 grams | 100% salt control |
| 2 | NaCl | 3.366 grams | 75% salt control |
| 3 | NaCl | 2.244 grams | 50% salt control |
| 4 | NaCl/L-aspartic acid/L-arginine* (53% NaCl by weight) (1:1 mole ratio between the two amino acids) | 4.488 grams | 53% salt control plus enhancer |

*A crystalline residue obtained from the evaporation of an aqueous solution of the three compounds.

A panel of 6 tasters unanimously concluded that Sample #4 was saltier than Sample #1; thus, addition of L-aspartic acid/L-arginine may reduce the weight of salt or more. The tasters also indicated that both Samples #4 and #1 were saltier than Samples #2 and #3, meaning that they were able to distinguish the relative saltiness at different salt levels.

EXAMPLE 2

A boneless chicken breast was shaken in a bag containing no salt added chicken base (74.415 grams) and salt (NaCl) or salt/salt enhancer (quantity specified in samples below). The coated chicken was placed on a flat pan and it was baked at 450° F. for 15 minutes. It was tasted hot.

| Sample # | Salt or Salt/Salt Enhancer | Total Weight | Comment |
|---|---|---|---|
| 1 | NaCl | 3.547 grams | 100% salt control |
| 2 | NaCl/L-aspartic acid/L-arginine (53% NaCl by weight) (1:1 mole ratio between the two amino acids) | 3.547 grams | 53% salt control plus enhancer |

Out of a panel of 6 tasters, 5 indicated Sample #2 was saltier than Sample #1. One taster indicated that two samples were equally salty. This result indicated that the addition of L-aspartic acid/L-arginine would enable the reduction of salt by 47% or more without affecting the overall saltiness of this food.

Additional samples of chicken are prepared in the similar manner above with the following results.

| Sample # | Salt or Salt/Salt Enhancer | Total Weight | Comment |
|---|---|---|---|
| 3 | NaCl* | 1.88 grams | 53% salt control |
| 4 | NaCl/L-aspartic acid/L-arginine* (53% NaCl by weight) (1:1 mole ratio between the two amino acids) | 3.547 grams | 53% salt control plus enhancer |

Four tasters out of a panel of 6 indicated Sample #4 was saltier than Sample #1.

In a similar manner as above, chicken was prepared with the following results.

| Sample # | Salt or Salt/Salt Enhancer | Total Weight | Comment |
|---|---|---|---|
| 5 | NaCl<br>L-aspartic acid<br>L-arginine | 1.892 grams<br>0.718 grams<br>0.94 grams | 53% salt control plus enhancer |
| 6 | NaCl | 1.892 grams | 53% salt control |

Seven tasters out of a panel of 12 indicated Sample #5 was saltier than Sample #6.

Chicken prepared in a similar manner as above:

| Sample # | Salt or Salt/Salt Enhancer | Total Weight | Comment |
|---|---|---|---|
| 7 | NaCl | 3.547 grams | 100% salt control |
| 8 | NaCl<br>L-aspartic acid<br>L-arginine | 3.547 grams<br>1.331 grams<br>1.742 grams | 100% salt control plus enhancer |

A panel of 6 tasters unanimously concluded Sample #8 was saltier. The results from Samples #5 through #8 indicated that L-aspartic acid/L-arginine would enhance saltiness either at a low salt or high salt levels.

Chicken prepared in a similar manner as above:

| Sample # | Salt or Salt/Salt Enhancer | Total Weight | Comment |
|---|---|---|---|
| 9 | NaCl | 2.66 grams | 75% salt control |
|   | L-aspartic acid/L-arginine (1:1 mole ratio) | 2.66 grams | plus enhancer |
| 10 | NaCl | 2.66 grams | 75% salt control |
| 11 | NaCl | 3.54 grams | 100% salt control |

This example revealed the enhancement at the medium salt level. The enhancer used was a crystalline residue obtained from evaporation of an aqueous solution of L-aspartic acid/L-arginine. Eight tasters out of a panel of 9 indicated Sample #9 was saltier than Sample #11. Five out of 9 indicated Sample #9 was saltier than Sample #10.

Chicken prepared in a similar manner as above:

| Sample # | Salt or Salt/Salt Enhancer | Total Weight | Comment |
|---|---|---|---|
| 12 | NaCl | 3.54 grams | 100% salt control |
| 13 | NaCl | 2.12 grams | 60% salt control |
|   | L-aspartic acid/L-arginine (1:1 mole ratio) | 2.12 grams | plus enhancer |
| 14 | NaCl | 2.12 grams | 60% salt control |

Seven tasters out of a panel of 10 indicated that Sample #13 was saltier than or equally salty as Sample #12. Six panelists indicated Sample #13 was saltier than Sample #14.

Chicken prepared in a similar manner as above:

| Sample # | Salt or Salt/Salt Enhancer | Total Weight | Comment |
|---|---|---|---|
| 15 | NaCl | 3.54 grams | 100% salt control |
| 16 | NaCl | 2.12 grams | 60% salt control |
|   | L-aspartic acid/L-arginine(1:1.2 mole ratio) | 2.12 grams | plus enhancer |
| 17 | NaCl | 2.12 grams | 60% salt control |

Five tasters out of a panel of 7 indicated Sample #16 was saltier than Sample #15. Four out of 7 tasters indicated Sample #16 was saltier than Sample #17.

Chicken prepared in a similar manner as above:

| Sample # | Salt or Salt/Salt Enhancer | Total Weight | Comment |
|---|---|---|---|
| 18 | NaCl | 3.54 grams | 100% salt control |
| 19 | NaCl | 2.12 grams | 60% salt control |
|   | L-aspartic acid/L-arginine(1.2:1 mole ratio) | 2.12 grams | plus enhancer |
| 20 | NaCl | 2.12 grams | 60% salt control |

Eight tasters out of a panel of 12 indicated Sample #19 was saltier than or equally salty as Sample #18. Six out of 12 tasters indicated Sample #19 was saltier than Sample #20.

EXAMPLE 3

Tomato sauce composed of the following ingredients was prepared. To the tomato sauce (166 grams) was added either salt or salt with enhancer (the quantity was indicated in the data below). After being heated in a microwave oven for 5 to 7 minutes, the Samples were tasted, and their relative saltiness determined.

| Ingredient | Weight % |
|---|---|
| Water | 40.1 |
| Sugar | 2.5 |
| Spices | 1.4 |
| Starch | 2.0 |
| Crushed/diced tomato | 39.0 |
| Garlic | 1.0 |
| Olive oil | 1.0 |
| Cheese | 1.0 |
| Diced onion | 12.0 |

| Sample # | Salt or Salt/Salt Enhancer | Total Weight | Comment |
|---|---|---|---|
| 1 | NaCl | 0.42 grams | 50% salt control |
| 2 | NaCl | 0.83 grams | 100% salt control |
| 3 | NaCl | 0.42 grams | 50% salt control |
|   | L-aspartic acid/L-arginine (1:1 mole ratio) | 0.42 grams | plus enhancer |

Eight tasters out of a panel of 10 indicated that Sample #3 was either saltier or equally salty as Sample #2. This means addition of L-aspartic acid/L-arginine mixture into tomato sauce could reduce salt by 50% or more without affecting the salty taste. Seven tasters out of 10 indicated Sample #3 was saltier than Sample #1.

Tomato sauce prepared in a similar manner as above:

| Sample # | Salt or Salt/Salt Enhancer | Total Weight | Comment |
|---|---|---|---|
| 4 | NaCl | 0.332 grams | 40% salt control |
| 5 | NaCl | 0.83 grams | 100% salt control |
| 6 | NaCl | 0.332 grams | 40% salt control |
|   | L-aspartic acid/L-arginine (1:1 mole ratio) | 0.42 grams | plus enhancer |

Eight tasters out of a panel of 12 indicated that Sample #5 was saltier than Sample #6. Three tasters indicated the opposite, while one couldn't tell the difference between Samples #5 and #6. Seven tasters out of 12 indicated Sample #6 was saltier than Sample #4. These results indicated that L-aspartic acid/L-arginine mixture did enhance the saltiness of the salt in tomato sauce, but the 40% salt control plus the enhancer might not taste as salty as the 100% salt control sample. Therefore, the maximum reduction of salt appeared to be between 50 and 60%.

EXAMPLE 4

Microwaveable Macaroni and Cheese

To a microwaveable tray containing 60 grams of pasta and a cheese sauce mix (33.3 grams) was added a small amount of salt or salt with enhancer (the quantity is indicated in the data below). Hot water (223 grams, 50° C.) was added to the tray, and the mixture was well mixed. The tray was heated in a microwave oven on "high" for 5 minutes, stirred and allowed to stand for 2 minutes before being tasted.

| Sample # | Salt or Salt/Salt Enhancer | Total Weight | Comment |
|---|---|---|---|
| 1 | NaCl | 0.6 grams | 100% salt control |

| Sample # | Salt or Salt/Salt Enhancer | Total Weight | Comment |
|---|---|---|---|
| 2 | — | — | No added salt |

A panel of 6 tasters unanimously indicated Sample #1 was saltier than Sample #2. This experiment was conducted to detect the taster's sensitivity to saltiness caused by the addition of salt (2% by weight of cheese sauce mix) over and on top of the salt already present in the cheese sauce mix. The result clearly showed that tasters could distinguish the difference in saltiness between a salt-added sample and a no salt-added sample.

Microwaveable macaroni and cheese prepared similar as above:

| Sample # | Salt or Salt/Salt Enhancer | Total Weight | Comment |
|---|---|---|---|
| 3 | NaCl | 0.6 grams | 100% salt control |
| 4 | NaCl<br>L-aspartic acid/L-arginine (1:1 mole ratio) | 0.3 grams<br>0.3 grams | 50% salt control plus enhancer |
| 5 | L-aspartic acid/L-arginine (1:1 mole ratio) | 0.6 grams | No added salt (enhancer only) |

A panel of 11 tasters tasted these Samples. A scale of 0 to 10 (10 being the most salty) was used to mark the saltiness of each Sample. The average value for each of the 3 Samples was 5.72, 5.95 and 5.68, respectively. With the standard deviation being 0.12, the three values are virtually equal, meaning all three Samples are judged equally salty. It was therefore concluded that L-aspartic acid/L-arginine mixture could replace 50 to 100% of the added salt in the original recipe.

What is claimed is:

1. An edible salt enhancing composition comprising a combination of L-aspartic acid and L-arginine and sodium chloride wherein the mole ratio of L-aspartic acid to L-arginine is between about 0.8:1 to about 1:1.2 and wherein the weight ratio of the combination of L-aspartic acid and L-arginine to sodium chlorine is 0.5:1 to 1:1.5.

2. The composition of claim 1 wherein the mole ratio of L-aspartic acid to L-arginine is 1 to 1.

3. The composition of claim 1 wherein the weight ratio of the combination of L-aspartic acid and L-arginine to sodium chloride is between about 0.8:1 to about 1:1.2.

4. The composition of claim 1 wherein the weight ratio of the combination of L-aspartic acid and L-arginine to sodium chloride is 1 to 1.

* * * * *